B. M. BARRON.
ADJUSTABLE SHELF SUPPORT.
APPLICATION FILED APR. 12, 1910.
966,883.
Patented Aug. 9, 1910.
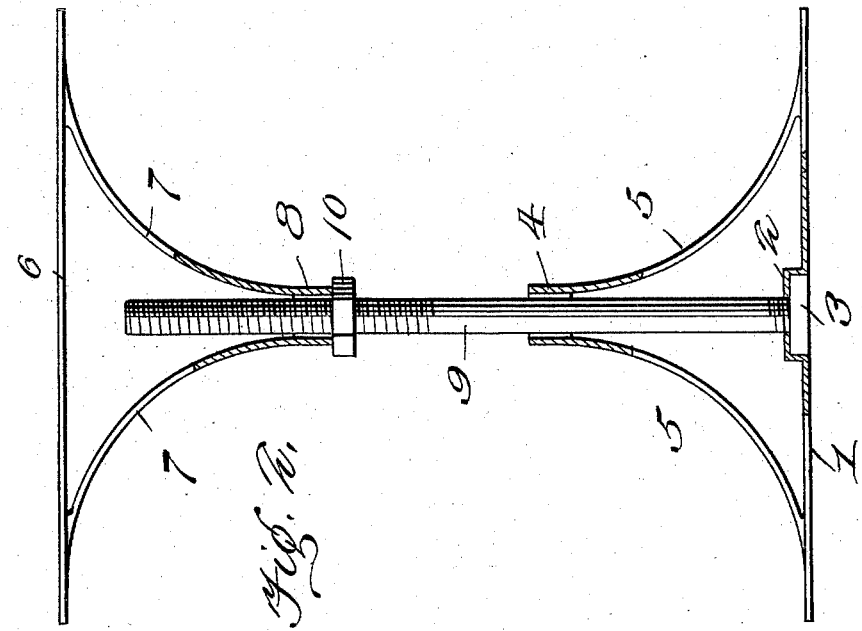
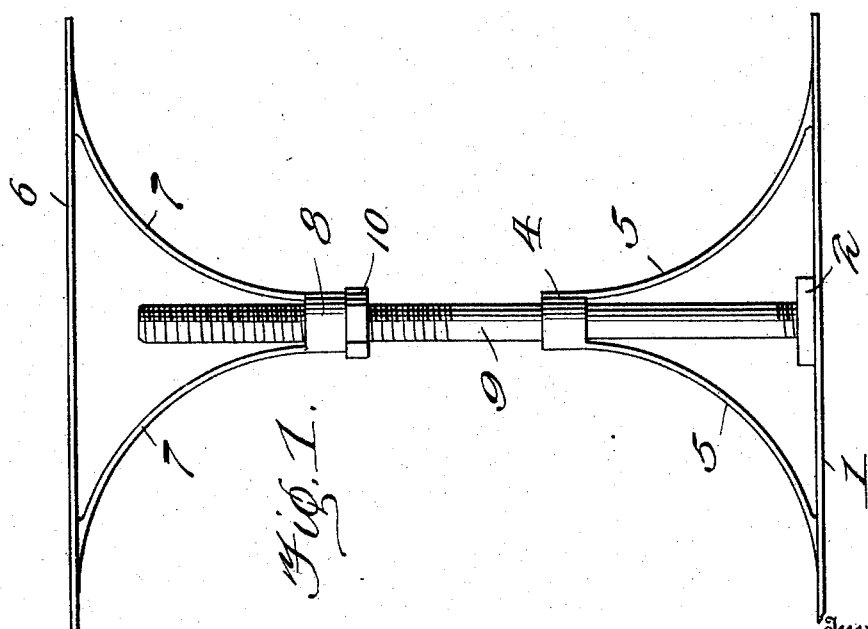
Inventor
Bert M. Barron
By Victor J. Evans
Attorney
Witnesses

UNITED STATES PATENT OFFICE.

BERT M. BARRON, OF KENSINGTON, KANSAS.

ADJUSTABLE SHELF-SUPPORT.

966,883.  Specification of Letters Patent.  Patented Aug. 9, 1910.

Application filed April 12, 1910.  Serial No. 554,925.

*To all whom it may concern:*

Be it known that I, BERT M. BARRON, a citizen of the United States of America, residing at Kensington, in the county of Smith and State of Kansas, have invented new and useful Improvements in Adjustable Shelf-Supports, of which the following is a specification.

This invention relates to an adjustable shelf support, and has for an object the provision of a shelf-supporting member and a base member and means operable between the two for adjusting the members relatively.

In the drawing, forming a portion of this specification and in which like numerals of reference indicate similar parts in the several views:—Figure 1 is an end view of my improved shelf support. Fig. 2 is a detail vertical section therethrough.

My improved shelf support consists of a base member 1 which is preferably formed of metal and stamped to provide a socket 2 for the reception of a nut 3. The base member 1 is provided with a supporting sleeve member 4 and with brace arms 5 which connect the said sleeve member with the base.

The supporting member 6 is disposed immediately above the member 1, and as illustrated, it is provided with depending arms 7 whose extremities are suitably secured to a sleeve member 8. This sleeve member is located in line with the sleeve member 4 on the base 1. An adjusting screw 9 is threaded at its lower extremity for engagement in the bore of the nut 3. This screw extends through the sleeve members 4 and 8 and it is threaded for the adjustment thereon of a nut 10. This nut is disposed immediately beneath the sleeve member 8 and it may be operated manually to obtain the desired adjustment of the member 6.

The device herein described and shown is extremely simple in construction, it may be conveniently knocked down to occupy but very little space during its transportation and when set up its adjustable features conveniently permit the relative adjustments of the companion shelf members as will be understood.

I claim:

A shelf support comprising a base member stamped to form a socket, a nut seated in said socket, a screw engaged at its lower extremity with the said nut, a sleeve supported by the said base member and embracing the said screw, the said screw being formed immediately above the said sleeve with a threaded portion, a member disposed immediately above the said base member, a sleeve supported by the said second member and embracing the said screw. and a nut adjustable on the screw and operable to bear against the said second sleeve so as to move the second member toward or away from the said base member.

In testimony whereof I affix my signature in presence of two witnesses.

BERT M. BARRON.

Witnesses:
J. CHURCHMAN,
S. L. BRACKEN.